United States Patent [19]

Kunz

[11] 4,337,838
[45] Jul. 6, 1982

[54] WEIGHING APPARATUS INCLUDING IMPROVED PERMANENT MAGNET SYSTEM

[75] Inventor: Peter Kunz, Gossau, Switzerland

[73] Assignee: Mettler Instrumente AG, Greifense, Switzerland

[21] Appl. No.: 255,670

[22] Filed: Apr. 20, 1981

[30] Foreign Application Priority Data

Jul. 30, 1980 [CH] Switzerland ............. 5806/80

[51] Int. Cl.³ .............................................. G01G 7/00
[52] U.S. Cl. ......................... 177/212; 177/210 EM; 177/DIG. 5
[58] Field of Search ......... 177/212, 210 EM, DIG. 5, 177/229

[56] References Cited

U.S. PATENT DOCUMENTS

| | | | |
|---|---|---|---|
| 3,322,222 | 5/1967 | Baur | 177/212 X |
| 4,043,415 | 8/1977 | Luchinger | 177/229 X |
| 4,090,575 | 5/1978 | Kunz | 177/212 X |
| 4,099,587 | 7/1978 | Kaufmann | 177/212 X |
| 4,109,738 | 8/1978 | Kunz | 177/212 |
| 4,245,711 | 1/1981 | Kunz | 177/212 |
| 4,311,202 | 1/1982 | Kunz | 177/212 |

Primary Examiner—Joseph W. Hartary
Attorney, Agent, or Firm—Laubscher, Philpitt & Laubscher

[57] ABSTRACT

An improved weighing apparatus of the electromagnetic load compensation type is disclosed, characterized by the provision of a stationary permanent magnet system including two oppositely arranged pairs of spaced parallel flat magnet members that cooperate to define a common air gap. The compensation current coil, which is connected for movement with the movable load-receiving member, is of a flat annular configuration and is contained in the plane of the air gap extending between the magnet members of each pair. The magnet members of one pair are magnetized oppositely from those of the other pair, whereby the magnetic field established across the portion of the air gap between the permanent magnet members of one pair is of a direction opposite that established between the permanent magnet members of the other pair. Consequently, not only can the compensation current for a desired compensation force effect be reduced, but also, the manufacture of the permanent magnet system is greatly simplified.

8 Claims, 4 Drawing Figures

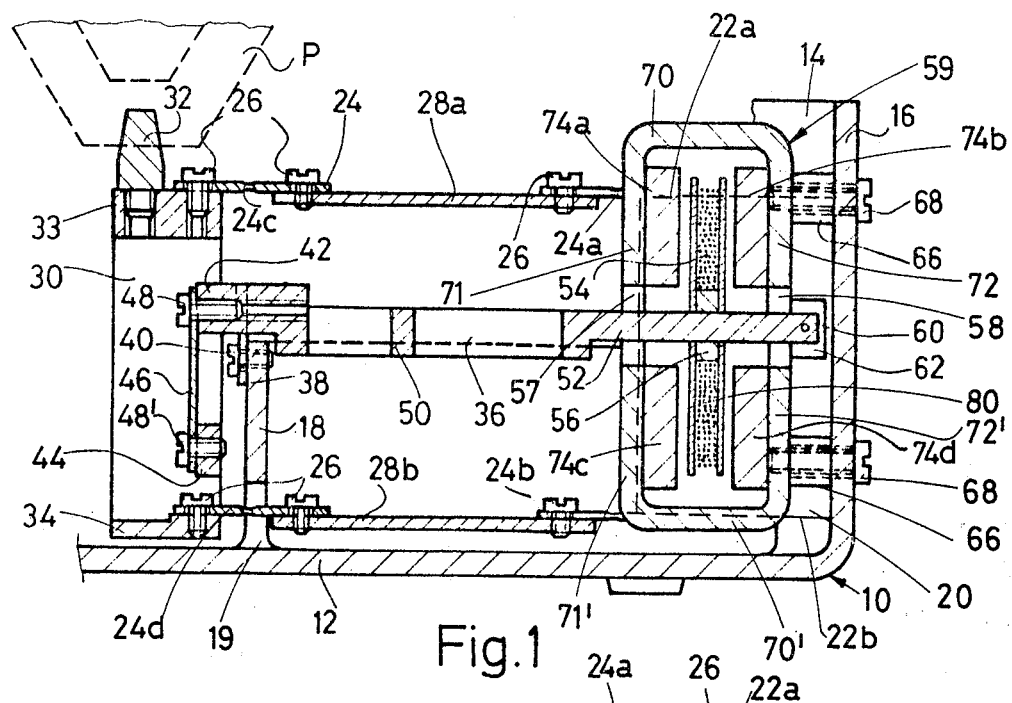
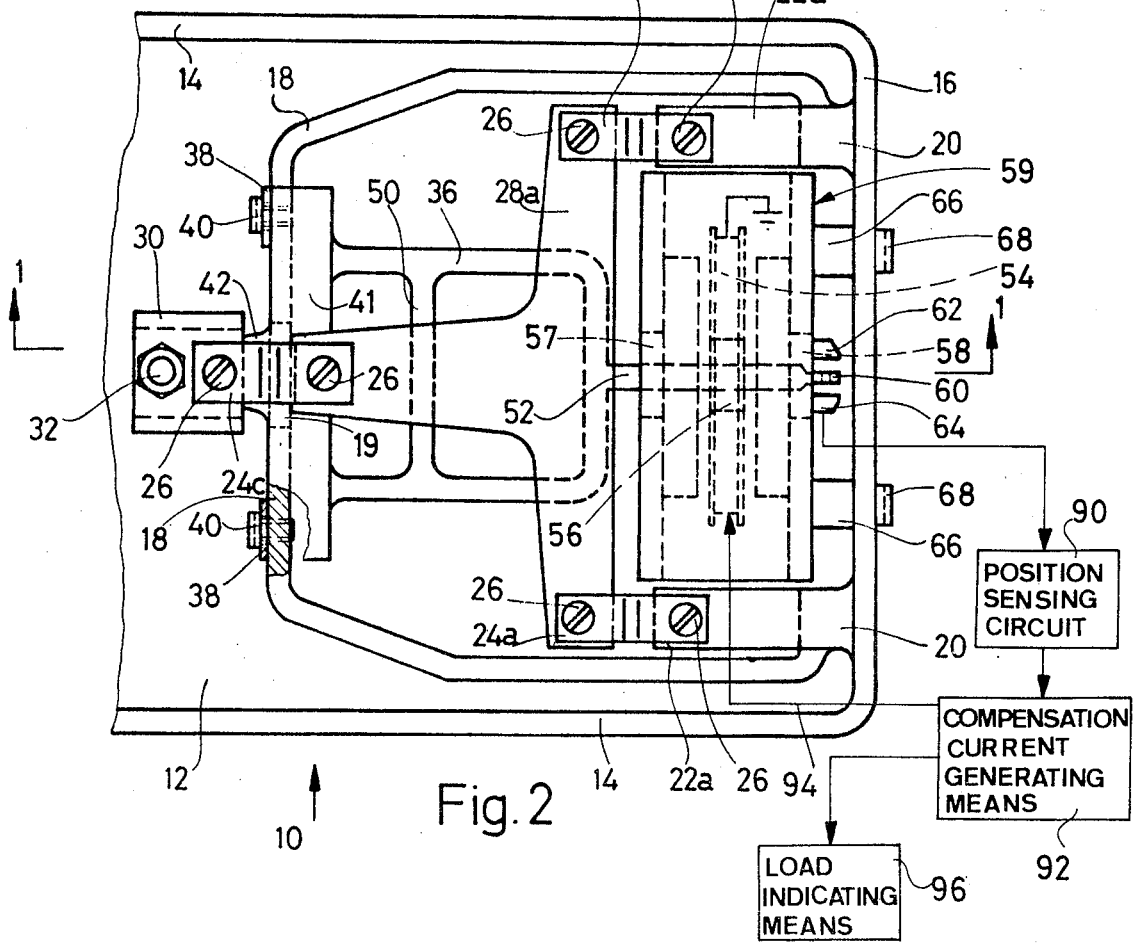
Fig.1
Fig.2

WEIGHING APPARATUS INCLUDING IMPROVED PERMANENT MAGNET SYSTEM

BRIEF DESCRIPTION OF THE PRIOR ART

Weighing systems of the electro-magnetic load compensation type are well known in the patented prior art, as evidenced, for example, by the inventor's prior U.S. Pat. Nos. 4,109,738 and 4,245,711, the Kunz et al U.S. Pat. No. 4,090,575, and the U.S. Pat. Nos. to Lüchinger 4,043,415 and Kaufman No. 4,099,587, among others. In these systems, a compensation coil is connected with the movable load-receiving member for movement relative to a stationary magnetic field produced by permanent magnet means connected with the frame of the apparatus. Position-responsive means and compensation current generating means supply compensating current to the coil to produce a force for returning the load-receiving member to its initial no-load position, the magnitude of the compensating current being a function of the applied load as visually indicated by a load indicating device.

In the Kunz U.S. application Ser. No. 141,148 filed Apr. 17, 1980 now U.S. Pat. No. 4,211,202, a relatively compact weighing apparatus of the aforementioned load compensation type is disclosed in which a permanent magnet system is provided using a disk-shaped magnetic core having oppositely magnetized areas. The opposing course of the magnetic field line in the air gap here is necessary to produce a desired force effect, but requires a certain laborious magnetizing and assembly procedure during manufacture.

SUMMARY OF THE INVENTION

It is the purpose of the present invention, on the one hand, to simplify the manufacture of the permanent magnet system and, on the other hand, to reduce the coil current required for the predetermined compensation force effect. For this purpose it is proposed according to the invention that the permanent magnet system comprise at least two pairs of flat magnets, which are arranged in a fixed manner on both sides of the compensation coil which is made in the form of a flat annular coil, whereby one magnet pair is magnetized oppositely with respect to the other magnet pair. By using flat magnets, arranged by pairs, manufacturing becomes simpler and the use of at least two pairs (depending upon the available dimensions) leads to a strengthening of the magnetic field and thus, assuming the same compensation force effect, to a reduction of the required coil current (or, in the case of the same coil current, to a greater compensation force).

The permanent magnet system is preferably made up of two halves which are essentially symmetrical and each of which comprises at least one magnet pair. This design offers special advantages in manufacturing: both halves of the permanent magnet system can now be magnetized together and in one work operation and can then be assembled together, after corresponding alignment with respect to each other.

The arrangement of the coil in itself is optional. It can be attached not only directly to a load receiver, which, for example, is guided in a parallel direction, but also on a force transmission member. A design is preferred where the load receiver system comprises a balance beam at whose one end the compensation coil is mounted normal to the longitudinal axis of the lever of the scale. Here the position indicator means can also be mounted adjacent the coil at the end of the balance beam.

Accordingly, a primary object of the present invention is to provide an improved weighing apparatus of the electro-magnetic load compensation type including magnetic field establishing means having two pairs of spaced permanent magnet members arranged to define a common air gap in which an annular flat compensation coil is movably arranged, the pairs of magnet members being oppositely arranged relative to each other so that the direction of the field of one portion of the air gap is opposite that of another portion.

According to a more specific object of the invention, the permanent magnet means includes a pair of U-shaped yoke members upon the inner surfaces of which the permanent magnet members are mounted in spaced relation, respectively, the yoke members being mounted in inverted relation relative to each other with their leg portions in abutting relation. The extremities of the leg portions contain central recesses that cooperate to define aligned central openings through the permanent magnet system for receiving one arm of a two-armed pivotally mounted lever that is connected for movement by the load-receiving member. The compensation coil is mounted concentrically upon the said one lever arm for movement in the stationary field produced by the permanent magnet means.

BRIEF DESCRIPTION OF THE DRAWINGS

Other objects and advantages of the invention will become apparent from a study of the following specification when viewed in the light of the accompanying drawing, in which:

FIG. 1 is a detailed sectional view of the weighing apparatus of the present invention taken along line 1—1 of FIG. 2, certain parts having been removed for the sake of clarity;

FIG. 2 is a top plan view of the apparatus of FIG. 1;

DETAILED DESCRIPTION

Figure 3:
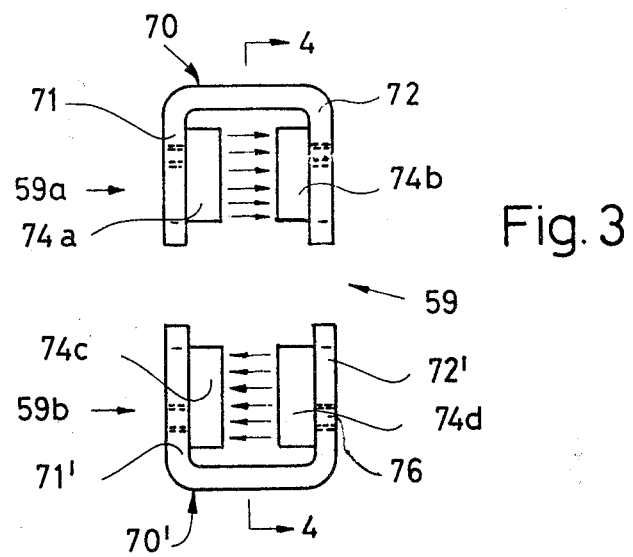
FIG. 3 is an exploded end view of the permanent magnet means of FIG. 1.

Referring first more particularly to FIGS. 1 and 2, the weighing apparatus of the present invention includes a rigid cast metal frame 10 including bottom, side and end walls 12, 14 and 16, respectively. Integral with the bottom wall 12 is an upstanding generally U-shaped rib portion 18 the transverse portion of which remote from the end wall 16 contains an access opening 19, the purpose of which will be described later. Integral with the inner surface of the end wall 16 are a pair of parallel spaced horizontally extending support lugs 20 having horizontal upper and lower surfaces 22a and 22b, respectively. Secured at one end of the upper surfaces 22a of the support lugs by screws 26 are a pair of flat horizontal parallel resilient upper bearing members 24a, and similarly secured at one end to the lower surfaces 22b of the support lugs are a second pair of flat horizontal parallel resilient lower bearing members 24b. The transverse arm portions of upper and lower generally T-shaped parallel guide links 28a, 28b are secured by screws 26 to the other ends of the upper and lower flat resilient bearings 24a and 24b, respectively. The free extremities of the trunk portions of the guide links are secured by screws 26 to upper and lower horizontal parallel flat resilient bearings 24c and 24d, respectively. The other ends of these latter bearings are secured by screws 26 to the upper and lower ends of the hollow load receiving member 30 having at its upper end a spindle 32 for removably supporting the load pan P (shown in phantom in FIG. 1). The parallel T-shaped guide links 28a and 28b, together with the flat resilient bearings 24a–24d, support the load-receiving member 30 for vertical displacement relative to its illustrated initial no-load position as is known in the art. As shown in FIG. 1, the lower flat resilient bearing 24d extends through access opening 19 in the U-shaped rib portion 18 for connection with the load-receiving member 30 and the lower guide link 28b.

Pivotally connected intermediate its ends with the transverse portion of the rib portion 18 by a pair of vertical flat resilient bearings 38 is a two-armed lever 36. Thus the lower ends of the vertical flat bearings are secured by screws 40 to the rib portion 18, while the upper ends of the bearings 38 are secured by screws 40 to the horizontal transverse body portion 41 of the two-armed lever. This transverse body portion includes a centrally arranged longitudinally extending nipple portion 42 to which is secured by screw 48 the upper end of vertical flat resilient suspension bearing 46. The lower end of the bearing 46 is secured by screw 48' with an integral transverse bar portion 44 of the load-receiving member 30. The central body portion of the two-arm lever 36 is hollow and includes a transverse strengthening strut 50, at its right hand end, the lever arm includes a horizontal projection 52 that extends through a pair of aligned openings 57 and 58 contained in the permanent magnet means 59. Mounted concentrically upon the lever arm projection 52 within the permanent magnet means is a compensation coil 54 wound on a spool having a hub portion 56 mounted on projection 52. The free end 60 of the projection 52 extends between stationary photocell position detecting means including a light cell 62 and a position signal generating light-responsive detector 64. As is known in the art, the position responsive signal from detector 64 is transmitted to the position sensing circuit 90 for supplying a signal to the compensation current generating means 92, whereby compensating current is supplied to coil 54 via conductor 94, thereby producing a force for displacing the lever arm 36 and the load-receiving member toward the initial no-load position. The magnitude of the compensation current is a function of the load applied to the weighing pan P, and is visually indicated as a function of load by the load indicating means 96.

In accordance with the characterizing feature of the present invention, the permanent magnet system 59 includes a sectional housing consisting of a pair of generally U-shaped flux-conductive soft metal yoke members 70, 70' that are connected with the rear wall 16 of the frame by pairs of upper and lower connecting means including tubular spacer members 66 and screws 68. The lower U-shaped yoke member 70' is inverted relative to the upper member, the lower extremities of the downwardly extending leg portions 71 and 72 of the upper member 70 being in abutting contact with the upper extremities of the upwardly extending leg portions 71', 72' of the lower yoke member 70'.

Figure 4:
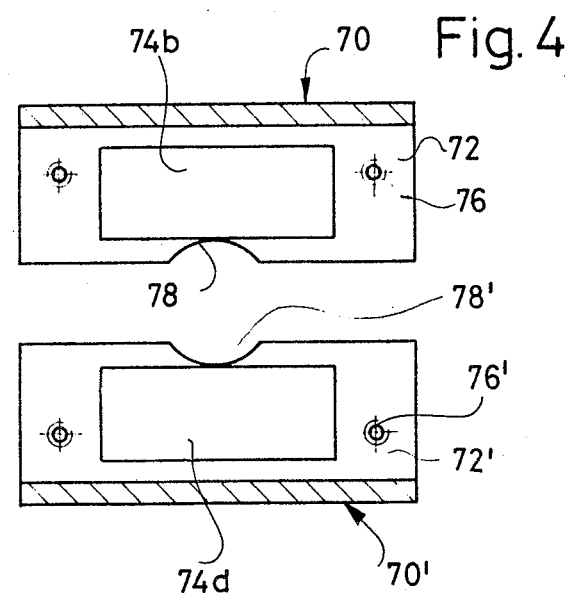
FIG. 4 is a sectional view taken along line 4—4 of FIG. 3.

Referring now to the exploded views of FIGS. 3 and 4, it will be seen that there are secured (by adhesive means, for example) to the inner surfaces of the leg portions of the yoke members 70 and 70' pairs of spaced permanent magnet members 74a, 74b and 74c, 74d, respectively. The lower and upper extremities of each of the leg portions of the yokes 70 and 71 contain corresponding central recesses 78 and 78', respectively, which recesses cooperate to define the openings 57 and 58 in the permanent magnet system when the yoke sections are assembled and mounted on the frame as shown in FIG. 1, the screws 68 terminating in end portions that are threadably connected with corresponding openings 76, 76' contained in the adjacent yoke leg portions.

The permanent magnet sections 70 and 70' are preferably magnetized simultaneously by conventional magnetizing means to produce magnetic fields extending across the space between the opposed magnet members of each section. In accordance with a further characterizing feature of the invention, one of the sections is rotated 180° about its vertical axis prior to assembly, thereby to cause the magnetic field established between the spaced upper magnet members on upper yoke member 70 to extend in a direction opposite that of the magnetic field established between the spaced magnet members 74c and 74d of the lower yoke member 70', as shown by the arrows in FIG. 3. When the yoke sections are thus assembled and mounted as shown in FIG. 1, the spaces between the magnets of each yoke section define a common air gap 80 in which the compensation coil is movably arranged.

Instead of the generally rectangular flat magnets 74, one can use those with a square cross-section. Furthermore, in each case several pairs for each half (59a or 59b) can be used, depending upon the situation.

While in accordance with the provisions of the Patent Statutes the preferred form and embodiment of the invention has been illustrated and described, it is apparent that modifications and changes may be made without deviating from the inventive concepts set forth above.

What is claimed is:

1. In a weighing apparatus of the electromagnetic load compensation return-to-zero type including a frame (10), load-receiving means (30) connected for vertical movement from a normal no-load position relative to the frame, permanent magnet means (59) connected with the frame for establishing a permanent magnetic field, compensation coil means (54) connected with said load-receiving means for movement in said magnetic field, means responsive to displacement of said load-receiving member, upon the application of a load thereto, from its initial no-load position for supplying compensating current to said coil means to produce a restoring force for returning said load-receiving means to its initial no-load position, and indicator means for indicating the magnitude of the load as a function of the compensating current required to return the load-receiving means to its initial no-load position;

the improvement wherein (a) said permanent magnet means comprises two pairs of spaced parallel flat magnet members (74a, 74b; 74c, 74d), whereby the spaces between the magnet members of each pair define a common air gap (80), the magnet members of one pair being oppositely magnetized relative to the corresponding magnet member of the other pair so that the magnetic field between one pair of magnet members extends in a direction opposite that of the magnetic field established between the other pair of magnet members;

(b) and further wherein said compensation coil means comprises a flat annular coil (54) contained in a plane extending in said air gap between and parallel with said magnet members, said coil normally being symmetrically arranged relative to said magnet members when said load-receiving member is in its initial no-load position.

2. Apparatus as defined in claim 1, wherein said permanent magnet means further includes a pair of symmetrical yoke members (70, 70') for connecting said pairs of magnet members with said frame, respectively.

3. Apparatus as defined in claim 2, wherein said load receiving means includes a lever arm (36) connected for pivotal movement relative to said frame, said compensation coil being normal to and concentrically mounted on said lever arm.

4. Apparatus as defined in claim 3, wherein each of said yoke members has a corresponding U-shaped configuration, said yoke members being arranged in inverted relation to each other with the extremities of the leg portions thereof being in abutting engagement, at least one leg of one yoke member and the corresponding leg of the other yoke member containing corresponding recesses (78, 78') defining an opening (57) for receiving said lever arm.

5. Apparatus as defined in claim 4, wherein said magnet members are mounted on the inner surfaces of the leg portions of said yoke members in symmetrical relation to said recesses, respectively.

6. Apparatus as defined in claim 5, wherein said lever arm is mounted for pivotal movement about a horizontal pivot axis, said lever arm normally being generally horizontal when said load-receiving means is in the no-load position; and further wherein said yoke members are arranged with their opposed leg portions extending vertically, the plane containing said compensation coil being generally vertical.

7. Apparatus as defined in claim 6, wherein said magnet members have the configuration of corresponding rectangular prisms, said magnet members being vertically arranged with their major axes extending horizontally.

8. Apparatus as defined in claim 4, wherein the other leg of each yoke member contains at its extremity a corresponding recess for defining a second opening 58 through which one terminal portion (60) of said lever arm extends, said means for supplying compensating current to said coil including position sensing means (62, 64) mounted on said frame for cooperation with said lever arm terminal portion.

* * * * *